US005561350A

United States Patent [19]

Frus et al.

[11] Patent Number: 5,561,350

[45] Date of Patent: Oct. 1, 1996

[54] IGNITION SYSTEM FOR A TURBINE ENGINE

[75] Inventors: John R. Frus; Frederick B. Sontag, both of Jacksonville, Fla.

[73] Assignee: Unison Industries, Jacksonville, Fla.

[21] Appl. No.: 394,694

[22] Filed: Feb. 24, 1995

Related U.S. Application Data

[63] Continuation of Ser. No. 74,654, Jun. 8, 1993, Pat. No. 5,399,942, which is a continuation of Ser. No. 697,084, May 8, 1991, Pat. No. 5,245,252, which is a continuation of Ser. No. 271,723, Nov. 15, 1988, Pat. No. 5,065,073.

[51] Int. Cl.$^{6}$ .......................... H05B 39/02; F02G 3/00; F02C 7/26

[52] U.S. Cl. .......................... 315/209 R; 355/209 CD; 355/209 T; 355/209 SC; 60/39.141

[58] Field of Search .......................... 361/257, 253, 361/256, 260, 263; 123/596, 597, 598, 605, 628, 606, 648, 650, 656; 60/39.144; 315/209 T, 209 CD, 209 M, 209 PZ, 209 SC

[56] References Cited

U.S. PATENT DOCUMENTS

| | | | |
|---|---|---|---|
| 2,651,005 | 9/1953 | Tognola | 315/206 |
| 2,717,335 | 9/1955 | Sims et al. | 315/183 |
| 2,799,809 | 7/1957 | Lautenberger | 317/83 |
| 2,896,123 | 7/1959 | McNulty | 315/177 |
| 2,938,147 | 5/1960 | Rose | 315/160 |
| 2,980,822 | 4/1961 | Short | 315/180 |
| 2,985,797 | 5/1961 | Williams et al. | 315/209 |
| 2,995,685 | 8/1961 | Lord | 317/79 |
| 3,045,148 | 7/1962 | McNulty et al. | 315/183 |
| 3,049,642 | 8/1962 | Quinn | 315/206 |
| 3,111,632 | 11/1963 | Murphy | 331/113 |
| 3,129,374 | 4/1964 | Relation et al. | 321/14 |
| 3,169,212 | 2/1965 | Walters | 315/223 |
| 3,176,158 | 3/1965 | Guignard | 307/88.5 |
| 3,223,887 | 12/1965 | Brown | 315/223 |

(List continued on next page.)

FOREIGN PATENT DOCUMENTS

| | | |
|---|---|---|
| 020069 | 11/1983 | European Pat. Off. . |
| 226302 | 6/1987 | European Pat. Off. . |
| 125820 | 6/1988 | European Pat. Off. . |

(List continued on next page.)

OTHER PUBLICATIONS

How Things Work, translation © George Allen & Unwin Ltd. (1967) pp. 580–581.

High Energy Igniters, G. N. Burland, Aerospace, Jan. 1984.

Conference on Power Applications of Controllable Semiconductor Devices, 1965.

(List continued on next page.)

*Primary Examiner*—Robert Pascal

*Assistant Examiner*—Michael Shingleton

*Attorney, Agent, or Firm*—Leydig, Voit & Mayer, Ltd.

[57] ABSTRACT

A unipolar ignition of the invention provides a current waveform at the ignitor plug which initially rises relatively slowly, followed by a transition to a fast rising current which quickly peaks and thereafter slowly dissipates. Such a current waveform provides an initially hotter and longer lasting spark which does not harm the ignitor plug of the system or shorten its life expectancy. Neither does the spark create stress on the solid state circuitry which delivers the energy to the ignitor plug. To provide the foregoing spark and current characteristics, an inductor having a saturable core is in series with the ignitor plug, and it provides an initially high inductance which limits the rate of current rise at the plug as energy is transferred from an energy storage device to the plug. As the current through the inductor increases, its core begins to saturate and the effective inductance begins to decrease, allowing the current to rise more quickly. As energy is transferred to the ignitor plug. the increasing saturation, decreasing inductance and increasing current complement one another, causing the rate of current rise to increase quickly to a high value desirable for ignition. Related features of the invention provide for easy diagnostics of the spark and for timing an ignition sequence and providing a repetition rate which aids in a successful ignition.

18 Claims, 9 Drawing Sheets

U.S. PATENT DOCUMENTS

| | | | |
|---|---|---|---|
| 3,302,629 | 2/1967 | Shano | 123/148 |
| 3,331,033 | 7/1967 | Johnston | 331/113 |
| 3,395,686 | 8/1968 | Minks | 123/148 |
| 3,407,795 | 10/1968 | Aiken et al. | 123/113 A |
| 3,421,825 | 1/1969 | Maycock | 431/208 |
| 3,424,945 | 1/1969 | Seider et al. | 315/240 |
| 3,450,942 | 7/1969 | Segall et al. | 315/209 |
| 3,470,386 | 9/1969 | Potts et al. | 307/218 |
| 3,504,490 | 4/1970 | Klamm | 60/39.09 |
| 3,504,658 | 4/1970 | Chavis | 123/148 |
| 3,505,563 | 4/1970 | Randall et al. | 315/213 |
| 3,534,719 | 10/1970 | Minks | 123/148 |
| 3,546,528 | 12/1970 | Fisher | 315/209 |
| 3,551,800 | 12/1970 | Widmer | 324/15 |
| 3,556,706 | 1/1971 | Campbell | 431/265 |
| 3,560,833 | 2/1971 | Oishi et al. | 321/2 |
| 3,569,727 | 3/1971 | Aggarwal et al. | 307/106 |
| 3,571,609 | 3/1971 | Knudsen | 307/106 |
| 3,575,153 | 4/1971 | Hardin et al. | 123/148 |
| 3,581,726 | 6/1971 | Plume, Jr. | 123/148 |
| 3,583,378 | 6/1971 | Pattee | 123/148 |
| 3,584,929 | 6/1971 | Schuette | 315/244 |
| 3,600,887 | 8/1971 | Gault et al. | 60/39.14 |
| 3,629,652 | 12/1971 | Maycock et al. | 315/239 |
| 3,635,202 | 1/1972 | Issler et al. | 123/148 E |
| 3,675,077 | 7/1972 | Minks | 315/209 R |
| 3,681,001 | 8/1972 | Potts | 431/264 |
| 3,716,758 | 2/1973 | Palazzetti | 317/96 |
| 3,731,144 | 5/1973 | McKeown | 315/209 T |
| 3,740,589 | 6/1973 | Minks | 307/275 |
| 3,750,637 | 8/1973 | Minks | 123/148 E |
| 3,769,545 | 10/1973 | Crane | 315/219 |
| 3,793,583 | 2/1974 | Glomski, et al. | 324/15 |
| 3,793,584 | 2/1974 | Liebermann | 324/16 R |
| 3,806,305 | 4/1974 | Dietz et al. | 431/74 |
| 3,818,885 | 6/1974 | Canup | 123/148 |
| 3,824,432 | 7/1974 | Gersing | 317/79 |
| 3,835,350 | 9/1974 | Thakore | 315/209 T |
| 3,838,328 | 9/1974 | Lundy | 321/2 |
| 3,839,659 | 10/1974 | Bruijning et al. | 315/209 SC |
| 3,849,670 | 11/1974 | Lourigan | 307/108 |
| 3,852,623 | 12/1974 | Nelson et al. | 307/293 |
| 3,857,376 | 12/1974 | Williams | 123/148 E |
| 3,869,645 | 3/1975 | Collins | 315/209 T |
| 3,889,160 | 6/1975 | Cobarg | 317/96 |
| 3,894,273 | 7/1975 | Newport, Jr. et al. | 317/96 |
| 3,906,919 | 9/1975 | Asik et al. | 123/148 E |
| 3,910,246 | 10/1975 | Canup | 123/148 E |
| 3,918,425 | 11/1975 | Pulzer | 123/148 E |
| 3,942,102 | 3/1976 | Kuhn et al. | 324/16 R |
| 3,958,168 | 5/1976 | Grundberg | 321/2 |
| 3,961,240 | 6/1976 | Pohl | 324/16 R |
| 3,961,613 | 6/1976 | Canup | 123/148 E |
| 4,006,403 | 2/1977 | Olsen | 324/16 |
| 4,027,198 | 5/1977 | Linkroum | 315/209 CD |
| 4,080,589 | 3/1978 | Kline | 340/146.1 A X |
| 4,122,816 | 10/1978 | Fitzgerald et al. | 123/148 DC |
| 4,129,895 | 12/1978 | Witting | 361/257 |
| 4,136,301 | 1/1979 | Shimojo et al. | 315/209 T |
| 4,152,655 | 5/1979 | Przybyla et al. | 328/120 |
| 4,154,205 | 5/1979 | Foster | 123/148 CB |
| 4,167,767 | 9/1979 | Courier de Mere | 361/256 |
| 4,191,911 | 3/1980 | Gerry | 315/209 R |
| 4,203,052 | 5/1980 | Bechtel | 315/209 CD |
| 4,209,779 | 6/1980 | Beck et al. | 340/683 |
| 4,240,198 | 3/1966 | Loudon et al. | 123/148 |
| 4,245,609 | 1/1981 | Gerry | 123/594 |
| 4,247,880 | 1/1981 | Morio | 361/256 |
| 4,261,025 | 4/1981 | Chafer et al. | 361/257 |
| 4,285,321 | 8/1981 | Phelon et al. | 123/599 |
| 4,329,628 | 5/1982 | Bohan, Jr. | 315/209 SC |
| 4,337,515 | 6/1982 | Kreft | 364/551 |
| 4,344,122 | 8/1982 | Jones | 363/23 |
| 4,349,008 | 9/1982 | Wainwright | 123/620 |
| 4,353,091 | 10/1982 | Hoppe | 358/137 |
| 4,394,742 | 7/1983 | Crummer et al. | 364/487 |
| 4,401,948 | 8/1983 | Miura et al. | 324/378 |
| 4,414,804 | 11/1983 | Menard et al. | 60/39.141 |
| 4,424,556 | 1/1984 | Maeda et al. | 363/17 |
| 4,430,628 | 2/1984 | Nilssen | 331/113 A |
| 4,454,560 | 6/1984 | Nakao et al. | 361/257 |
| 4,479,467 | 10/1984 | Burrows et al. | 123/606 |
| 4,502,454 | 3/1985 | Hamai et al. | 123/597 |
| 4,510,915 | 4/1985 | Ishikawa et al. | 123/620 |
| 4,522,184 | 6/1985 | Lepley | 123/599 |
| 4,535,380 | 8/1985 | Geary | 361/256 |
| 4,547,734 | 10/1985 | Spaude | 324/395 |
| 4,558,280 | 12/1985 | Koehl et al. | 324/399 |
| 4,561,707 | 12/1985 | Jackson | 315/209 CD |
| 4,589,398 | 5/1986 | Pate et al. | 123/596 |
| 4,613,797 | 9/1986 | Eggers et al. | 315/241 R |
| 4,628,269 | 12/1986 | Hunninghaus et al. | 328/120 |
| 4,636,777 | 1/1987 | Skerritt | 340/655 |
| 4,639,676 | 1/1987 | Kawai et al. | 324/380 |
| 4,688,538 | 8/1987 | Ward et al. | 123/598 |
| 4,696,280 | 9/1987 | Niggemeyer | 123/598 |
| 4,705,013 | 11/1987 | Minks | 123/598 |
| 4,758,790 | 7/1988 | Hunt | 324/379 |
| 4,760,341 | 7/1988 | Skerritt | 324/379 |
| 4,774,924 | 10/1988 | Minks | 123/618 |
| 4,783,991 | 11/1988 | Wixon | 73/117.3 |
| 4,791,349 | 12/1988 | Minks | 323/266 |
| 4,825,167 | 4/1989 | Bayba | 324/399 |
| 4,829,971 | 5/1989 | Minks | 123/598 |
| 4,833,369 | 5/1989 | White | 315/209 T |
| 4,839,772 | 6/1989 | Choi et al. | 361/256 |
| 4,841,925 | 6/1989 | Ward | 123/143 B |
| 4,918,389 | 4/1990 | Schleupen et al. | 324/399 |
| 4,922,396 | 5/1990 | Niggemeyer | 363/21 |
| 4,983,886 | 1/1991 | Balland | 315/209 CD |
| 5,017,874 | 5/1991 | DiNunzio | 324/578 |
| 5,032,969 | 7/1991 | Eggers et al. | 363/21 |
| 5,065,073 | 11/1991 | Frus | 315/209 R |
| 5,148,084 | 9/1992 | Frus | 315/76 |
| 5,245,252 | 9/1993 | Frus et al. | 315/209 R |

FOREIGN PATENT DOCUMENTS

| | | |
|---|---|---|
| 0277468 | 8/1988 | European Pat. Off. . |
| 384436 | 8/1990 | European Pat. Off. . |
| 0228840 | 7/1991 | European Pat. Off. . |
| 1097275 | 7/1955 | France . |
| 2317804 | 3/1977 | France . |
| 1539195 | 11/1966 | Germany . |
| 2040913 | 2/1972 | Germany . |
| 529558 | 11/1940 | United Kingdom . |
| 633854 | 12/1949 | United Kingdom . |
| 637286 | 5/1950 | United Kingdom . |
| 661410 | 11/1951 | United Kingdom . |
| 682877 | 11/1952 | United Kingdom . |
| 762097 | 11/1956 | United Kingdom . |
| 762119 | 11/1956 | United Kingdom . |
| 808991 | 2/1959 | United Kingdom . |
| 896161 | 5/1962 | United Kingdom . |
| 962417 | 7/1964 | United Kingdom . |
| 992288 | 5/1965 | United Kingdom . |
| 997139 | 7/1965 | United Kingdom . |
| 1018963 | 2/1966 | United Kingdom . |
| 1027259 | 4/1966 | United Kingdom . |
| 1035656 | 7/1966 | United Kingdom . |
| 1037664 | 8/1966 | United Kingdom . |
| 1045812 | 10/1966 | United Kingdom . |
| 1063257 | 3/1967 | United Kingdom . |

| | | |
|---|---|---|
| 1085434 | 10/1967 | United Kingdom . |
| 1102267 | 2/1968 | United Kingdom . |
| 1106923 | 3/1968 | United Kingdom . |
| 1106511 | 3/1968 | United Kingdom . |
| 1109158 | 4/1968 | United Kingdom . |
| 1109052 | 4/1968 | United Kingdom . |
| 1111791 | 5/1968 | United Kingdom . |
| 1117181 | 6/1968 | United Kingdom . |
| 1170020 | 7/1968 | United Kingdom . |
| 1132103 | 10/1968 | United Kingdom . |
| 1136243 | 12/1968 | United Kingdom . |
| 1135530 | 12/1968 | United Kingdom . |
| 1179229 | 1/1969 | United Kingdom . |
| 1182726 | 3/1970 | United Kingdom . |
| 1334230 | 4/1971 | United Kingdom . |
| 1239756 | 7/1971 | United Kingdom . |
| 1256885 | 12/1971 | United Kingdom . |
| 1255542 | 12/1971 | United Kingdom . |
| 1263248 | 2/1972 | United Kingdom . |
| 1268290 | 3/1972 | United Kingdom . |
| 1396280 | 5/1972 | United Kingdom . |
| 1400446 | 7/1972 | United Kingdom . |
| 1283905 | 8/1972 | United Kingdom . |
| 1327564 | 8/1973 | United Kingdom . |
| 1353588 | 5/1974 | United Kingdom . |
| 1414920 | 11/1975 | United Kingdom . |
| 1424195 | 2/1976 | United Kingdom . |
| 1464477 | 2/1977 | United Kingdom . |
| 1467286 | 3/1977 | United Kingdom . |
| 1493391 | 11/1977 | United Kingdom . |
| 1537279 | 12/1978 | United Kingdom . |
| 1537278 | 12/1978 | United Kingdom . |
| 1551746 | 8/1979 | United Kingdom . |
| 1571884 | 7/1980 | United Kingdom . |
| 2064138 | 6/1981 | United Kingdom . |
| 2085523 | 4/1982 | United Kingdom . |
| 2130751 | 6/1984 | United Kingdom . |

OTHER PUBLICATIONS

Automotive Electrical Equipment, Crouse (1966), pp. 444–451.

Automotive Fuel and Ignition Systems, Frazee, et al. 1964, pp. 326–357.

IEEE Standard Dictionary of Electrical and Electronics Terms (4th Edition) 1988, p. 901.

Standard Handbook for Electrical Engineers, A. E. Knowlton McGraw–Hill, 1957, pp. 1845–1846.

Lucas Aerospace Overhaul Manual, Type NB.10605 High Energy Ignition Unit (Jul., 1978), Fig. 2.

Lucas Aerospace Overhaul Manual, Type NB.10705 High Energy Ignition Unit (May, 1974), Fig. 2.

Radio & Electronic Laboratory Handbook, M. G. Scroggie (8th Edition 1971), p. 151.

J. G. Tracy, B. H. Bailey "Ferrites Simplify Snubber Design for a Traction Chopper Utilizing Series Thyristors" IAS/IEEE Tenth Annual Mtg., Sep. 1975, PG. 10.026, pp. 25–29.

Transactions of AIEE 1958 Applications of Nonlinear Magnetics.

The Illustrated Dictionary of Electronics (5th Edition), Rufus P. Turner, Stan Gibilisco, 1990, pp. 671–672.

Eugene Hnatek, Design of Solid–State Power Supplies, (2nd Edition), 1981.

Motorola TMOS Power MOSFET Data Book, Chapter 9 entitled "Spin–Off Technologies of TMOS", page 1–9–1 Dated at least a year before applicant's inventor.

Motorola Catalogue HB206, p. 88. Dated at least a year before applicant's inventor.

Eason, W. R., "Voltage Resetime—A New Ignition Criterion?, *Capacitor Discharge Piezo Electric, And Transistorized Spark Ignition Systems,*" The Technical Progress Series, 8, 9, 11–12 (Pergamon Press, Inc., New York, N.Y.) (1965).

Smith, *Gas Turbines and Jet Propulsion for Aircraft,* Title Page, Copyright Page and p. 78 (4th Ed. 1946).

Sawyer, *Sawyer's Gas Turbine Engineering Handbook,* vol. III, pp. 7–32 through 7–39, and Title Page (3rd Ed. 1985).

Hempel, *Power Semiconductor Handbook,* Title and Copyright Page, pp. 11–17 and 103 (1980).

Ward, *Transistor Ignition Systems Handbook,* Title Page, Copyright Page, pp. 66–73 (1963).

Pallett, *Aircraft Electrical Systems,* Title Page, Copyright Page, p. 161 (1989).

Society of Automotive Engineers, Inc., *Aerospace Information Report,* (AIR 784 A), pp. 1–27 (1975).

Lucas Aerospace, *Overhaul Manual,* pp. 2–3 (1978).

Davis, *Power Diode And Thyristor Circuits,,* Title Page, pp. V and 9–11 (1971).

RCA Corporation, *Solid–State Devices Manual,* Title Page, Table of Contents and pp. 150–173 and 448–471 (1975).

Gibbs et al., *Scorpio MK.2 Ignition System.*

Greenwood, *Automotive and Aircraft Electricity,* Title Page, Copyright Page and pp. 160–161 (1969).

Gentry et al., *Semiconductor Controlled Rectifiers: Principles and Applications of p–n–p–n Devices,* Title Page, Copyright Page and pp. 369–370 (1964).

Burke et al., *A Transistorized Contactless Low Voltage Ignition System,* pp. 52–56 (1963).

Welch, "Solid–State Ignition," pp. 47–51 (1963).

Lucas Aerospace, *Overhaul Manual Type NB. 9518 & NB.9568 High Energy Ignition Units,* pp. 1–5, 7/8 and 7 sheets of Appendices (1979).

Burgher, *Interrelated Parameters of Gas Turbine Engine Design and Electrical Ignition Systems* (1963).

Markus, *Modern Electronic Circuits Reference Manual,* Title Page, Coyright Page, p. 764 (1980).

"Low Voltage Exciter", *Aviation Equipment Maintenance,* (Dec. 1988).

Ramshaw, *Power Electronics Thyristor Controlled Power for Electric Motors,* Title Page, Copy right Page, pp. 23–26 (1973).

Graf et al., Solid–State Ignition Systems, Title Page, Preface, Contents, pp. 21–23, 26–27, 32–35, 68–77, 82–89, and 92–95 (1974).

General Electric, *SCR Manual,* Title Page, Copyright Page, p. 141 (6th Ed. 1979).

Mazda et al., *Thyristor Control Manual,* Title Page, Copyright Page, pp. 72–73 and 100–103 (1973).

Larew, *Ignition Systems,* Title Page, Copyright Page, Preface, pp. 162–180 and 198–202 (1968).

Rolls Royce plc, *The Jet Engine,* Title Page, copyright Page, and pp. 121–131 (1986).

Society of Automotive Engineers, Inc., *Capacitor Discharge, Piezo Electric and Transistorized Spark Ignition Systems,* Title Page and pp. 9–11 (1965).

Lucas Aerospace LTD., *Complete Electrical & Starting Systems Manual,* Title Page, pp. 3–7, 13–15 and 20. Dated before applicant's inventor.

Min et al., *An Improved Snubber Circuit For Power Semiconductors,* pp. 1017–1022 (1977).

General Electric Company, *Thyristors–Rectifiers,* Title Page, Copyright Page, pp. 5, 10–18, 33, 43, 55–56, and 74–77 (1982).

Tracy et al., *Ferrites Simplify Snubber Design for A Traction Chopper Utilizing Series Thyristors,* pp. 332–339 (1975).
Paice et al., *Nonlinear Reactors as Protective Elements for Thyristor Circuits,* pp. 228–232 (1967).
Tracy et al., *How To Simplify Snubber Design Using Ferrite* (1974).
Bird et al., *An Introduction to Power Electronics,* Title Page, Copyright Page, pp. vii and 22–34 (1983).
Sen, *Power Electronics,* Title Page, Copyright Page, pp. 60–65 (1987).
Eyquem S. A., Fiche Technique No. 251 (1978).
Turbomeca Eutdes, Note Technique No. 2347, (1974) (with translation of Sections 1–3.13).
*GE Thyristor Catalogue,* p. 141 (1979).
Sescosem, *Rectifiers, Diodes, Thyristors,* Title Page, contents, pages 439–459 (1976).
Cattermole, *Transistor Circuits,* Title Page, Copyright Page, pp. 320–329, 458–461, and 468–469 (1964).

IGNITION SYSTEM FOR A TURBINE ENGINE

This is a continuation of application Ser. No. 08/074,654, filed on Jun. 8, 1993 (now U.S. Pat. No. 5,399,942) which is a continuation of U.S. patent application Ser. No. 07/697,084 filed on May 8, 1991 (now U.S. Pat. No. 5,245,252), which is in turn a continuation of U.S. patent application Ser. No. 07/271,723 filed on Nov. 15, 1988 (now U.S. Pat. No. 5,065,723).

TECHNICAL FIELD

This invention generally relates to ignition systems and more particularly relates to a unipolar ignition for use in a wide variety of ambient conditions.

BACKGROUND OF THE INVENTION

Ignition systems for igniting fuel in a turbine engine have been in wide use since the 1950's, and although a great variety of systems exist today, they have remained fundamentally unchanged since that time. One reason the design of ignition systems has not experienced fundamental changes over the years is that the design of a practical ignition system for turbine engines presents a significant challenge since the electronics of the system must operate reliably in severe environments—i.e., a wide range of temperatures, mixture ratios, humidities and pressures. An operating turbine may, for example, experience pressures as low as a few tenths of an atmosphere or as high as 10 atmospheres, and the ignitor must work at both extremes. For example, a flame-out during operation may necessitate re-ignition of the turbine fuel at a high altitude. At such high altitudes, the pressure is often only a few tenths of an atmosphere. Similarly, temperatures may range from extreme cold (e.g., −65° F.), to very hot, for example when the high temperatures of the combustor soak the electronic module of the exciter in an ambient approaching 300° F.

Typical ignition systems consist of three components: the exciter box, the ignition leads and the ignitor plug. The plug may be one of two types: air gap or semiconductor gap. The air gap plug is associated with high tension ignition systems because conditions of high pressure or wetness require very high voltage (e.g., 15 kV) to ionize the gap. The semiconductor plug is associated with low tension systems because it performs reliably with only 2–5 kV. However, a semiconductor-type plug generates a spark when supplied with only 1–2 kV (low tension), provided the voltage is applied for a relatively long period of time. In a semiconductor plug, the "semiconductor" is a material that provides an electrical shunt path across the air gap. This material conducts at a constant and low voltage (typically 1 kV), independently of pressure. The small current accompanying the low voltage helps to ionize the fuel mixture above the semiconductor surface, and the arc forms thereafter. Once the arc develops, the semiconductor material does not conduct because the arc has much lower resistance, and the arc voltage is only about 30 volts. It is possible to use a semiconductor plug with high tension ignitions, but it is known in the art that this can cause excessive wear or even destruction of the semiconductor material. Even some low tension systems, which apply peak voltages of 5–8 kV, can damage the semiconductor element of the plug.

Categorizing ignition systems by the type of spark generated at the ignitor plug, there are two types of systems—bipolar and unipolar. In bipolar systems, the output is provided by an output transformer which steps up the relatively low voltage at an energy storage device to approximately 5–8 kV at the ignitor plug. Because an output transformer is utilized, the energy transferred to the the ignition plug is necessarily characterized by an alternating current which is typically of a relatively high frequency. The energy is delivered to the plug as a series of narrow pulses with high peak powers. As a result of delivery of the energy as a narrow pulse, a plug having a semiconductor gap is subjected to severe stress because the high voltages of the narrow pulses cause large, destructive currents in the semiconductor material prior to formation of an arc between the plug electrodes. Moreover, the components of the exciter and the ignition leads leading to the plug appear as lossy elements in a bipolar discharge, thereby reducing the energy transferred to the spark gap for igniting the turbine fuel mixture. Also, the bidirectional nature of the arc current causes wear on both the inner and outer cylindrical electrodes of a semiconductor ignitor plug.

Because of their fundamentally different methods of generating a spark, unipolar ignition systems require substantially different design considerations than those applicable to bipolar systems. For example, a unipolar ignition does not use a transformer at its output and, therefore, it is not characterized by the same disadvantages created by the AC current in a bipolar ignition system. A unipolar ignition system produces a single pulse without oscillation which is controlled to have a 2–3 kV peak voltage. This "low tension" voltage is safe for the semiconductor plug, and the duration of the pulse is relatively long compared to the pulse of a bipolar ignition system. Furthermore, the multiple pulses in a bipolar system must each have a higher peak than the single peak in a unipolar pulse if the energy delivered is to be the same. Because of these higher peaks, the losses in the electronics and the ignition leads of the bipolar system are substantially greater than in an equivalent unipolar system. Also, a unipolar ignition is more amenable to the use of a solid state switch since the switch can be of a simpler nature because it is only required to handle direct current. Furthermore, a unidirectional arc current at the semiconductor plug can be directed to cause wear primarily on the larger (outer concentric) electrode, and alleviate erosion of the smaller (inner) electrode which always has less physical mass.

Although applicant is unaware of any quantitative comparative data, a substantial segment of the ignition system industry believes that a unipolar ignition system delivers to the gap of an ignitor plug a significantly greater percentage of the energy stored in an energy storage device. Assuming unipolar systems deliver a greater percentage of their stored energy to the arc, a unipolar system is more efficient and therefore more effective than the same sized bipolar system. Even though unipolar ignition systems offer various advantages over bipolar systems and have remained fundamentally unchanged over the years, it is still possible to improve the spark quality of such systems and thereby provide improved performance reliability.

SUMMARY OF THE INVENTION

It is an object of the invention to provide higher quality sparks than were previously known in the art for unipolar exciters.

It is another object of the invention to provide a higher efficiency unipolar ignition which allows smaller components and more energy converted to heat at the spark.

It is a more detailed object of the invention to provide fuel igniting sparks which are hotter and of longer duration than sparks generated from conventional unipolar exciters. It is a related object of the invention to reliably provide such longer and hotter sparks under unfavorable conditions (e.g., cold and/or humid ambient air).

It is a further object of the invention to provide exciters that repeatedly generate longer and hotter sparks over relatively long time periods without component failure.

It is another object of the invention to provide a longer duration ionizing pulse to a semiconductor plug which can therefore be of lower voltage and current to preserve the life of the semiconductor element. It is a related object of the invention to provide a high power pulse to the arc commencing rapidly after the formation of a plasma in the gap above the semiconductor.

It is a separate and still further object of the invention to provide repeated unipolar or bipolar ignition during operation of a turbine engine without damaging the ignitor plug of the ignition, yet maximizing the opportunity for the initial combustion of fuel at start-up. In this connection, it is a more detailed object of the invention to provide an ignition system having an adaptive control capability which allows the system to be integrated into an overall start-up routine for a turbine engine for precisely timed ignition.

Another object of the invention is to provide an instantaneous indication of the operating condition of the ignition system for diagnostic use either during maintenance or in flight.

Briefly, a solid state unipolar ignition system is provided which includes an inductor wound on a magnetically saturable core such that the core saturates as energy is unidirectionally transferred from a storage device to a spark gap. Upon the initiation of energy transfer, the core of the inductor is not yet saturated and the inductance is relatively very high. As a result of this initially high inductance, current increases slowly through the solid state switch and the semiconductor ignitor. As the core of the inductor approaches saturation, the effective inductance of the inductor decreases, allowing the current through the newly formed plasma to increase at a significantly greater rate. Such a saturable inductor provides a longer and hotter spark across the air gap, while at the same time providing protection for the solid state devices which initiate the energy discharge. Furthermore, the saturable inductor provides a basis for a diagnostic circuit from which the quality of the energy discharge can be accurately and easily discerned.

In connection with providing protection for the solid state switch of the unipolar ignition system, the saturable core inductor is positioned in the system where it will affect the initial discharge current which occurs when the solid state switch turns on. A solid state switch composed of SCRs has a transition time from an off state to a fully on state during which application of high current or rate of current increase (di/dt) causes significant losses and stresses at the SCR. By limiting the initial current and its di/dt during the transition of the SCRs from their off states to their on states, the initially high inductance of the output inductor allows the SCRs to realize their normal life expectancy in what otherwise would be an unacceptably harsh electronic environment.

The initially low current and di/dt required for proper functioning of the SCR switches, however, is the antithesis of the type of current required for successful ignition of a fuel mixture. The apparently conflicting requirements for successful operation of SCRs in unipolar ignition systems and successful ignition of fuel is addressed by providing an output inductor whose core saturates, thereby effectively lowering the inductance and allowing a much higher di/dt. In essence, the saturable core inductor functions as a high inductance device during the transition time of the SCRs and a low inductance device immediately thereafter. Once the SCRs are fully turned on and capable of accepting heavy current flow, the core of the inductor saturates and the current rapidly rises to a peak. Such a rapidly rising current is the type of current best suited for fast and reliable ignition. Using a solid state switch and a conventional inductor in a unipolar ignition system results in a high di/dt during the transition time of the switch. This high di/dt during the transition state not only stresses the SCRs, it also causes energy which would otherwise be available at the spark gap to be converted to heat at the SCRs, thereby degrading the quality of the spark.

The characteristics of the current waveform provided by the invention may be tailored to the desired characteristics because the inductance is not constant, but varies depending on the magnitude of the DC current through the windings of the saturable inductor. By choosing the appropriate material, core volume, geometry, number of turns and wire gauge, the desired characteristics of initially low current followed by high di/dt can be achieved.

By providing a solid state switch in the unipolar ignition system of the invention, the energy storage device of the system can remain indefinitely in a static, fully charged condition. Discharge of the stored energy by turning on the switch can be responsive to an input signal totally independent of reaching a fixed charge at the energy storage device. This feature of the invention allows initiation of a spark during an ignition window which is defined by physical and environmental parameters that are most conducive to igniting the fuel mixture, and it is applicable to both unipolar and bipolar ignitions.

A related feature of the invention provides for operating the ignition system in a continuous mode during engine operation, utilizing a relatively slow repetition rate for the spark discharge. To initiate combustion, however, the ignition system steps up the rate of spark discharge to a rate which, if continued through the time of engine operation, would seriously erode the ignitor plug. To avoid such damage, stepped up rate of spark discharge occurs for only a short period of time. As with the last mentioned feature, this feature of the invention is applicable to both unipolar and bipolar ignitions.

Preferably, the invention utilizes a semiconductor-type ignitor plug. Applicant believes the low initial current provided by the invention greatly reduces the stress placed on the plug and thereby significantly increases its useful life. The low initial voltage gives the semiconductor material sufficient bias to conduct a low current which precedes creation of a spark. The low current allows the plug to ionize the air over the semiconductor material as is necessary for proper operation of the plug without unnecessarily stressing the plug by forcing high current through the semiconductor material prior to creation of a spark. Once the delayed high current reaches the plug, the air over the semiconductor material is ionized and able to carry the current away from the semiconductor material, thereby reducing stress at the plug, and losses by conduction of heat into the plug surface.

While the invention will be described in some detail with reference to a preferred embodiment, it will be understood that it is not intended to limit the invention to such detail. On the contrary, it is intended to cover all alternatives, modifications and equivalents which fall within the spirit and scope of the invention as defined by the appended claims.

DETAILED DESCRIPTION OF THE PREFERRED EMBODIMENT

Figure 1:
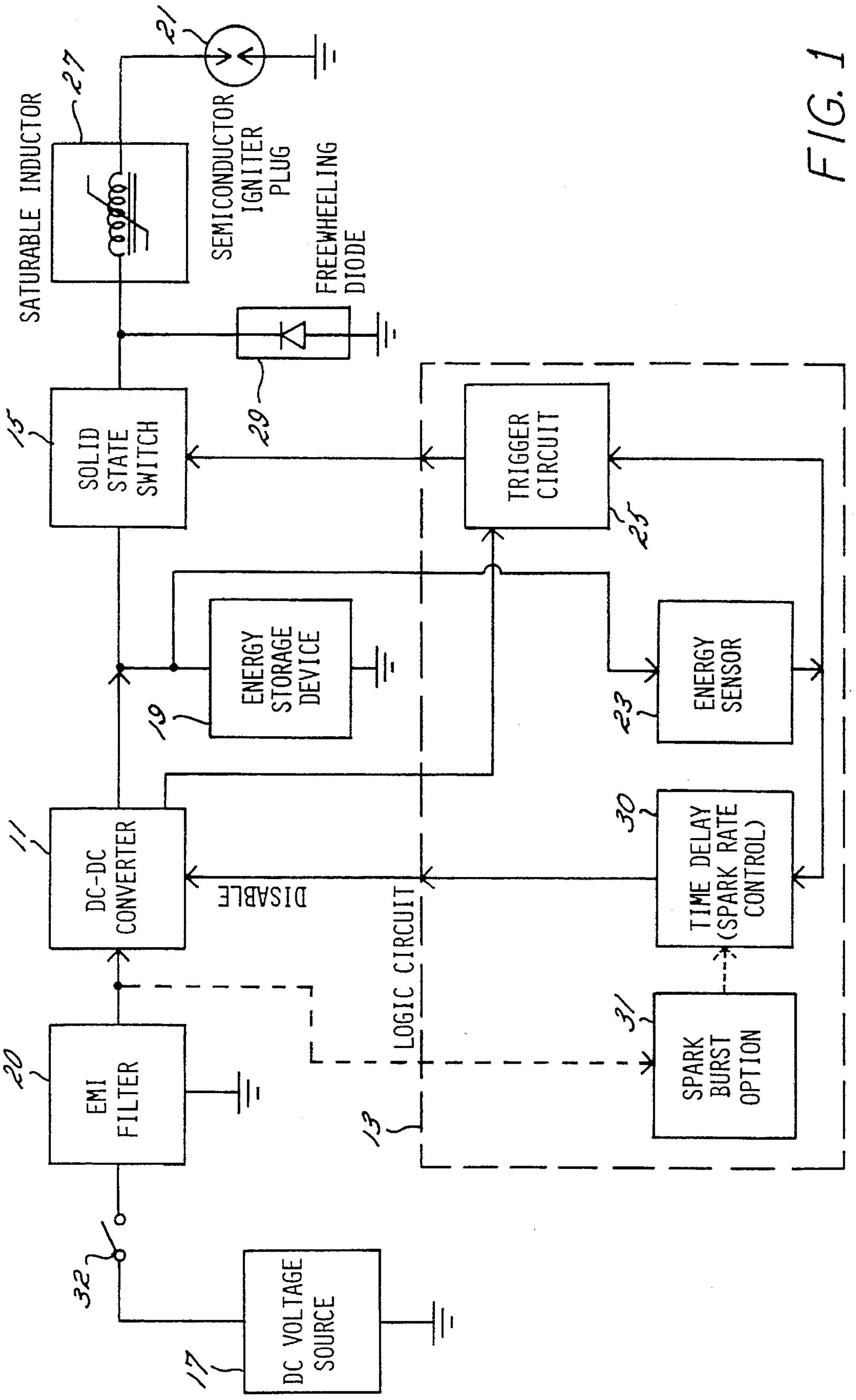
FIG. 1 is a block diagram of the ignition system of the invention according to a direct embodiment.
Figure 6:
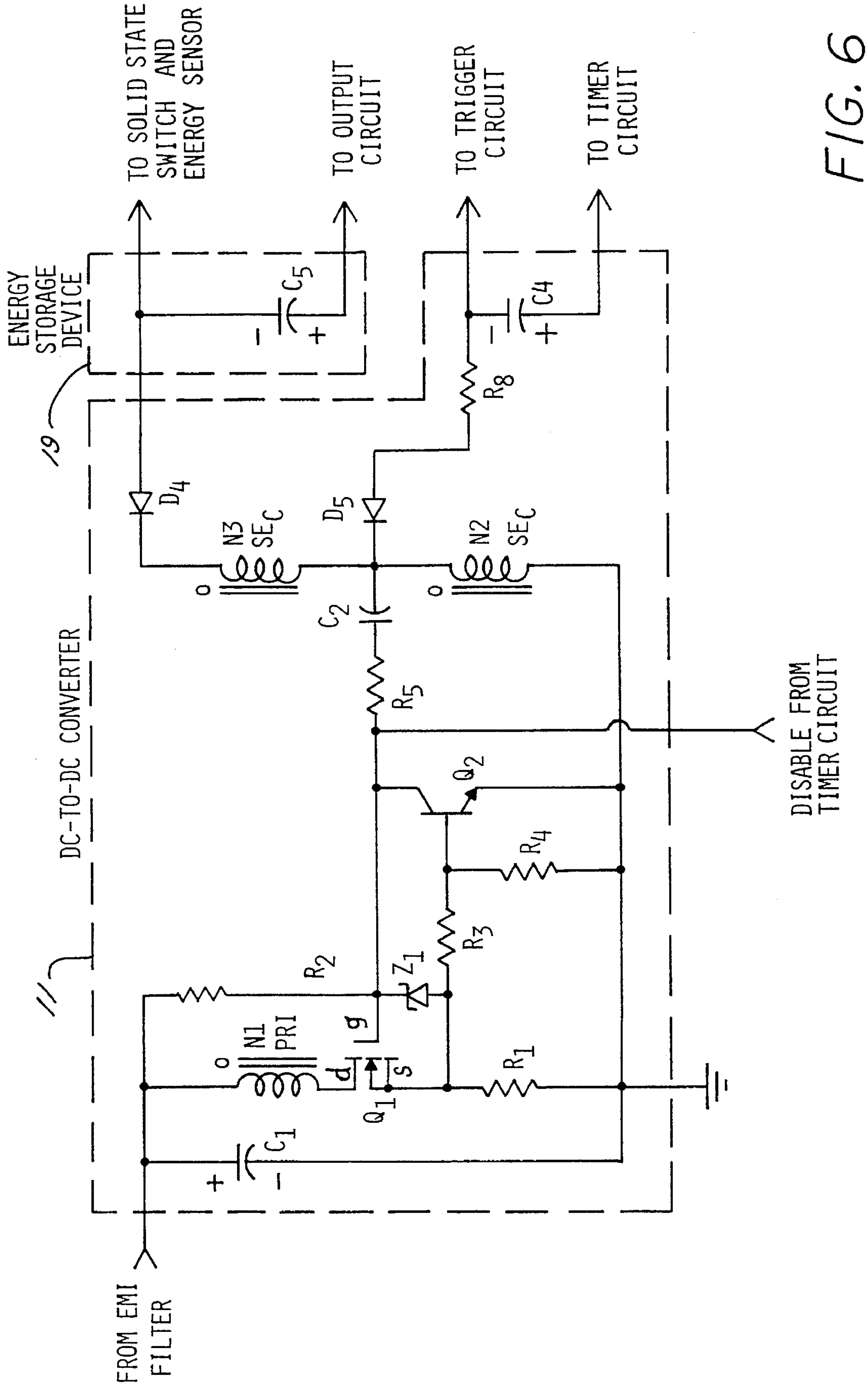
FIG. 6 is a circuit diagram according to an exemplary embodiment of the invention of a low voltage-to-high voltage converter and an energy storage device for providing a source of high energy to the spark gap.

Turning to the drawings and referring first to FIG. 1, a unipolar ignition system circuit includes a DC-to-DC converter 11, a logic circuit 13 and solid state switch 15. From a DC source 17 of relatively low voltage (e.g., 28 volts), the DC-to-DC converter 11 delivers a potential of approximately 2500 volts to an energy storage device 19 which is most commonly a capacitor as illustrated in FIG. 6. A broad band filter 20 is provided between the voltage source 17 and the DC-to-DC converter 11 which prevents high frequency noise generated by the exciter from escaping via the DC power input. It also protects the converter 11 from transients present on the aircraft electrical power system.

Many types of DC-to-DC converters well known in the art may be utilized in the ignition system of the invention. One type of converter known in the art as a "flyback" type converter utilizes a charge pump technique to build up the voltage at the energy storage device over a number of charge cycles. Once the charge cycles have built the voltage at the energy storage device 19 to a predetermined level, the charge pumping is interrupted, and the energy storage device discharges into a semiconductor ignitor plug 21 of the ignition system. Although the embodiment of the DC-to-DC converter 11 illustrated in FIG. 6 is a flyback type converter having the foregoing characteristics, it will be appreciated by those skilled in the design of ignition systems that other variations of flyback converters or other types of DC-to-DC converters may be substituted without deviation from the spirit of the invention.

Referring now to the logic circuit 13, when the energy storage device 19 has been charged with a predetermined amount of energy from the DC-to-DC converter 11, the energy sensor 23 responds by activating the trigger circuit 25 which turns on the solid state switch 15 and allows the energy in the storage device to be transferred to an output circuit which includes the commercially available semiconductor ignitor plug 21. The output circuit also includes a saturable inductor 27 and a freewheeling diode 29. The saturable inductor 27 introduces a phase lag between voltage and current such that the voltage first appears at the spark gap of the plug 21 in order to form a plasma before a current surge occurs. The freewheeling diode 29 prevents oscillation, resulting in a unipolar discharge current. The energy sensor 23 also starts a timer 30 which disables the DC-to-DC converter 11 so that the system does not attempt to simultaneously discharge and charge the storage device, and which holds it disabled to provide a delay before the next spark.

The spark rate which is established by the timer 30 must be chosen as a compromise between adequate spark rate to ignite the turbine and low enough spark rate to ensure long ignitor plug life. Also, modern safety standards increasingly require continuous operation of the ignition system in foul weather, and during critical operating conditions of an aircraft. The continuous operation assures a relight if a flame-out occurs.

In accordance with one important aspect of the invention, in order to satisfy these constraints, an optional spark burst circuit 31 is added which alters the spark rate set by timer 30, as will be discussed in reference to FIG. 7. When the ignition (starting) sequence begins, the spark burst circuit 31 switches the timer 30 to a high pulse rate condition. After sufficient time has elapsed for a normal ignition to have occurred, the spark burst circuit switches the timer back to a lower (maintenance) rate, which can be operated continuously for safety, but without prematurely wearing out the ignitor plug. The lower spark rate may also allow the exciter components to be smaller, since they would not have as high a thermal stress as would exist with continuous high-rate sparking. More generally, the spark burst circuit 31 generates a repetition of sparks for a predetermined time period where the repetition is at an average rate greater than the average rate of repetition which continues after ignition occurs.

An important feature of this invention is that the spark burst circuit 31 is activated upon application of DC power 17 to the unit by closing of switch 32. Thus, the sparking sequence is initiated at a fixed time relative to the engine starting sequence automatically synchronizing the two without requiring extra wiring connections. The circuit is also reactivated any time the power is interrupted and reapplied. This provides a high spark rate for starting the engine, followed by a lower rate which provides relight capability without prematurely wearing out the ignitor plug 21.

In the design of unipolar ignition systems utilizing a solid state switch, requirements which appear on their face to be conflicting must be reconciled. To ensure a spark at the gap of the ignitor plug 21 has the proper characteristics needed for reliably igniting fuel in a variety of ambient conditions (e.g., cold and/or wet), and with a high velocity flow of the mixture past the spark, a relatively high rate of current rise (di/dt) is required. However, a large di/dt has been found by applicant to place unacceptable stress on the solid state switch 15 since the rise time of the spark current is of the same order of magnitude as the turn-on time of the switch, which is typically several microseconds.

In accordance with another important aspect of the invention, the inductor 27 includes a saturable core, thereby controlling the discharge current which both protects the solid state switch 15 and ensures a reliable ignition of fuel under all types of ambient conditions. Initially, the saturable inductor 27 acts like a high inductance, limiting di/dt for the first few microseconds after the solid state switch 15 is closed. By limiting di/dt, the solid state switch 15 is given time to turn on before full current is achieved. This ensures a rate of current rise (di/dt) that will not stress the solid state switch 15 to an extent which shortens its rated life expectancy. When the inductor 27 saturates, its effective impedance is reduced, thereby providing a high pulse current at the gap which reliably ignites the mixture. Moreover, the initially high inductance provides a highly desirable extended lag between voltage and high current at the gap of the plug 21. Although a complete understanding of the spark phenomenon at the gap of the plug 21 is not appreciated in the art, applicant hypothesizes that the lag produces several desirable effects. Specifically, the ionization phase is completed before a current surge occurs; thus, the arc is formed in the plasma above the semiconductor material, and less heat is lost by surface conduction to the plug and semiconductor. Also, the less sudden application of power may result in less acoustic (shock), optical and electromagnetic radiation losses, and consequently more conversion to useful heat. Additionally, since the electronic components have had adequate turn-on time, their losses are minimized and the high current that follows will deliver a larger percentage of the total energy to the spark. Because the plasma is more completely formed, the arc resistance is low (as is the arc voltage); this results in a lower peak power and the savings is translated into a longer duration. By more evenly distributing the discharge current over time, applicant believes a superior spark is obtained in that it more reliably ignites fuel over a wide range of ambient conditions. In a unipolar ignition, according to the invention, the inductor 27 cooperates with a unidirectional device such as a freewheeling diode 29 in FIG. 1 to maintain a spark after the energy storage device 19 has been fully discharged. Energy stored in the inductor 27 during the discharge of the storage device 19 is released through the unidirectional diode 29 upon completion of the discharge by the storage device.

Figure 2:
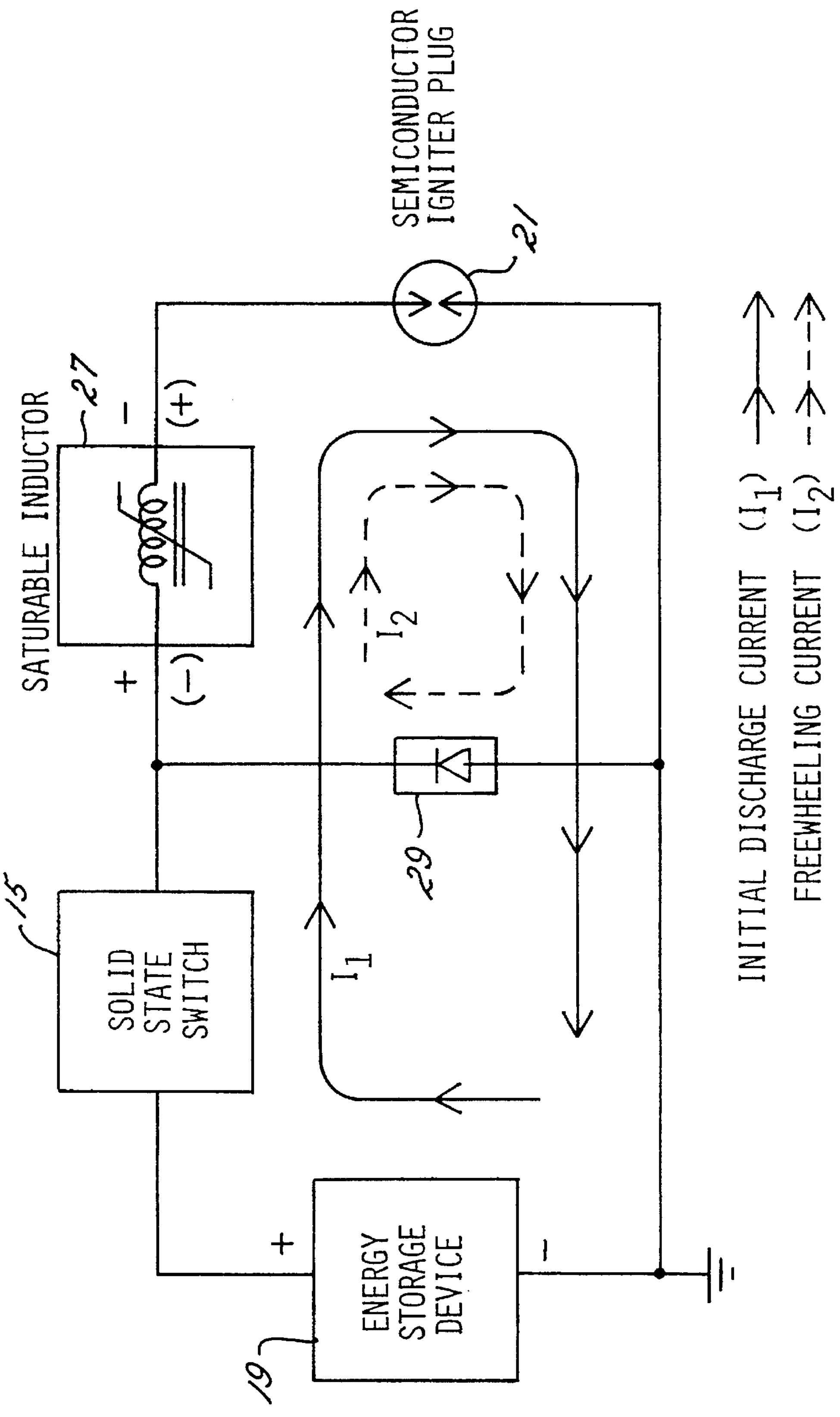
FIG. 2 is a schematic representation of the flow of current during generation of a spark by the ignition system of the invention, illustrating two current loops formed in the system during the generation of the spark.

Referring to FIG. 2, the energy dissipated at the ignitor plug 21 is initially sourced from the energy storage device 19, forming the initial discharge current loop $I_1$ through the solid state switch 15 and inductor 27. After the energy storage device 19 has been fully discharged, the inductor 27 cooperates with the unidirectional diode 29 to effectively shunt the discharge current away from the solid state switch 15 and the energy storage device 19 and forming a second current loop $I_2$. By shunting the energy storage device 19, "ringing" between the storage device and inductor 27 is prevented which accounts for the unipolar output, and the solid state switch 15 is not required to handle current for the entire life of the spark. As indicated by the parenthetic plus and minus signs associated with the inductor 27 in FIG. 2, when the discharge current through the ignitor plug 21 changes from current loop $I_1$ to loop $I_2$, the effective polarity of the inductor reverses. For the freewheeling current $I_2$, the inductor 27 functions as an energy source rather than a passive element as in current loop $I_1$. The change of the effective polarity of the inductor is virtually instantaneous and, once the bias of the freewheeling diode 29 is overcome, the current is very quickly diverted from the energy storage device 19 and through the diode.

Figure 3A:
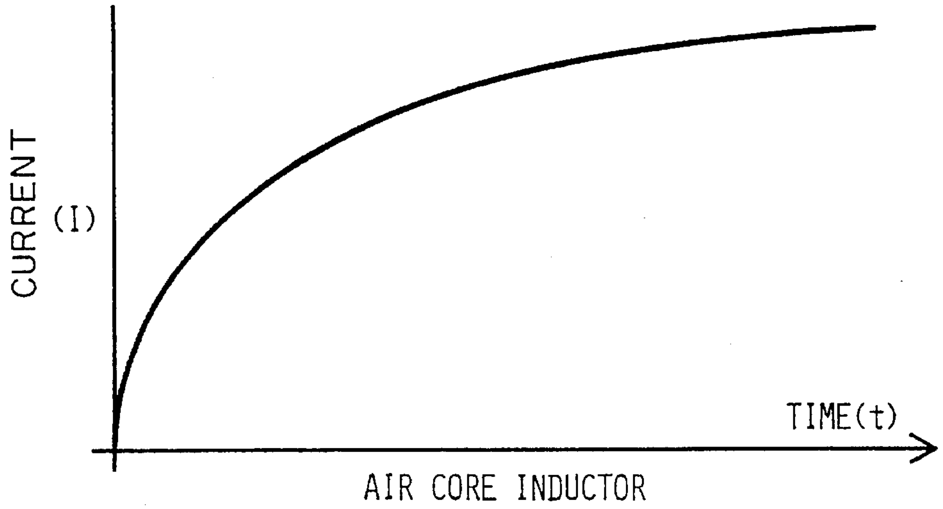
FIGS. 3*a*–3*b* are illustrations of idealized waveforms for the current flowing through an output inductor and across a spark gap in an ignition system, wherein the two current waveforms of FIGS. 3*a*–3*b* result from inductor having a non-saturating and saturating core, respectively.
Figure 3B:
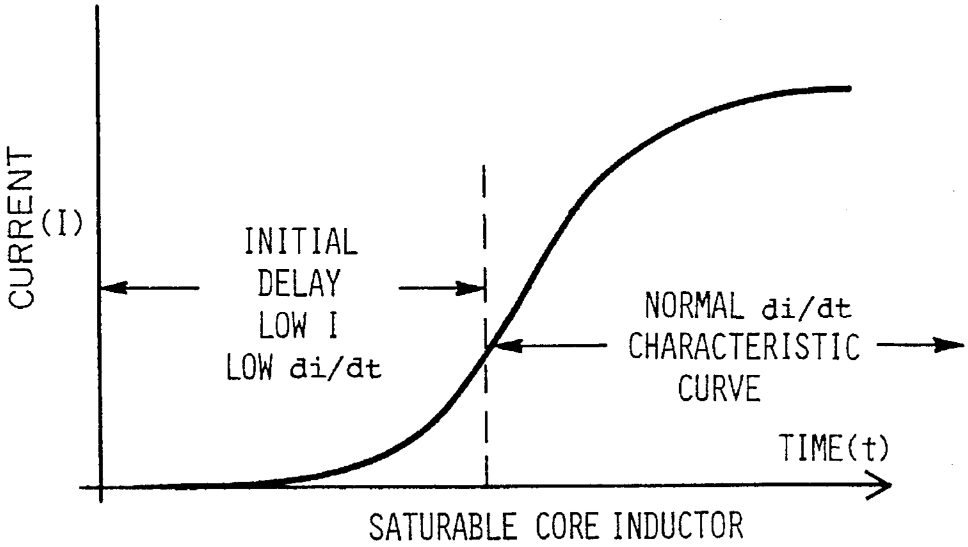

As illustrated by FIGS. **3*a* and 3*b*, the characteristic di/dt provided by a conventional inductor (FIG. 3*a*) is substantially different from the di/dt of an inductor having a saturable core (FIG. 3*b*). In current waveforms resulting from a conventional inductor, the di/dt starts out very high and then more gradually builds to a peak as the di/dt decreases to zero. In contrast to the monotonic decrease of di/dt in an idealized waveform for a conventional inductor, a saturable core inductor at first is characterized by a monotonically increasing di/dt, and this condition continues to exist until the inductor saturates. The factor which causes this uncharacteristic shape is dL/di, which is the change of inductance with respect to current due to the saturating of the core material. As the core of the inductor saturates, the inductance drops and the net di/dt actually increases during the saturation process. As the core becomes fully saturated, the di/dt returns to a monotonically decreasing value which goes to zero when peak current is reached. In FIG. 3*b***, the idealized waveform has been bisected into an initial low current and low di/dt time and a subsequent high current and high di/dt time. In the time period immediately preceding the bisection line, the core of the inductor is saturating and the effective inductance of the inductor is decreasing, causing the di/dt to increase. After saturation, the inductance value no longer changes, dL/di=0, and the current continues to rise according to the normal exponential curve expected for a fixed inductance.

Figure 4:
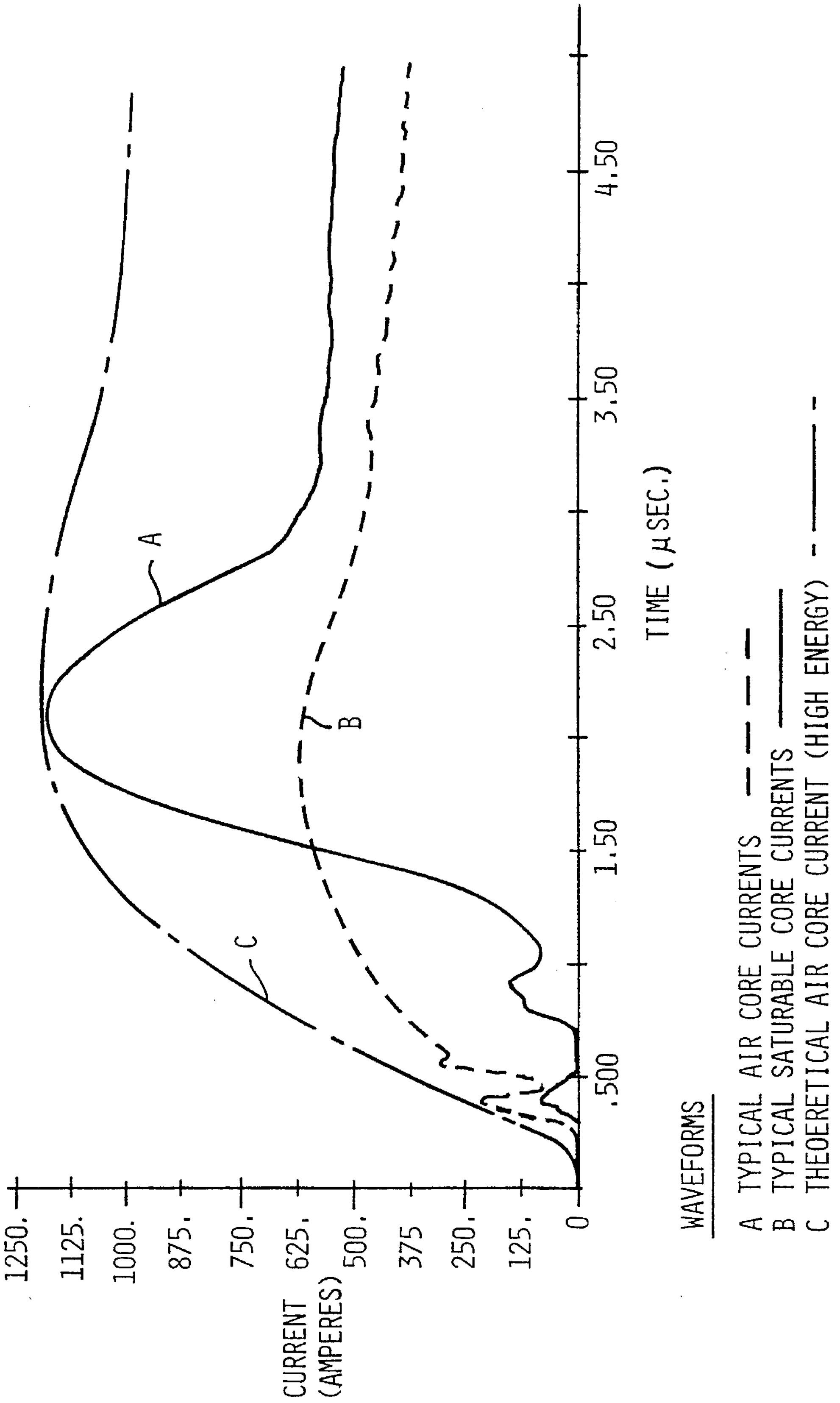
FIG. 4 is a graph of three current waveforms A, B and C showing the actual (A and B) and theoretical (C) current flow through an output inductor and across a spark gap in an ignition system, wherein waveforms A and C result from non-saturating inductor cores and waveform B results from a saturating inductor core.

Referring to the experimental current waveforms A and B of FIG. 4, waveform A is the current at an ignitor plug of a system utilizing a saturable core inductor in accordance with the invention. As can be seen from an inspection of waveform A, it has the characteristic shape described in connection with FIG. **3*b***. During the time period prior to saturation, the di/dt is low and the solid state switch of the system experiences only a relatively low level current as it turns on. As the core of the inductor reaches saturation, the current begins to rise relatively quickly as the inductance lessens.

Using a conventional inductor in place of the saturable core inductor, waveform B results. To avoid destructive heating of the solid state switch and premature failure of the ignition system, the peak energy delivered by the waveform B must be limited to significantly less than the peak energy from waveform A. If the peak energy from a conventional inductor is equal to that provided by a saturable core inductor as indicated by theoretical waveform C, the fast initial di/dt creates relatively high current levels before the solid state switch completes its transition from off to on. These high current levels destructively heat the solid state switch and make it an impractical device for use in a conventional unipolar ignition which does not incorporate this invention.

The saturable-core inductor 27 will generally have a closed magnetic path, or at most a very small air gap. It is known in the art that a toroid configuration for the magnetically permeable material comprising the core of the inductor works well in providing a saturable core.

Many materials are available from which a core can be constructed, and the choice affects the di/dt characteristics that will be achieved. In the preferred embodiment of this invention, a very high density iron powder core was used for the toroid. The high density gives the toroid high permeability (e.g., approximately 75) which results in very high initial inductance for a given size and number of turns of winding. Several other characteristics of the material make it a good choice. First, it is a relatively inexpensive material compared to alternative materials, such as the ferrites and metal alloys. Second, it has a high saturation level which is suitable for the large currents in an ignition. This results from the distributed gap property of iron powder cores due to the non-homogeneous makeup of discrete iron particles pressed together. Third, its characteristics remain fairly consistent over the large temperature range experienced by an ignition system.

Due to the wide differences between engines and ignitor plug characteristics, the applicant believes that other materials may be preferred for some systems, and use of those materials is also within the scope of this invention.

Figure 5:
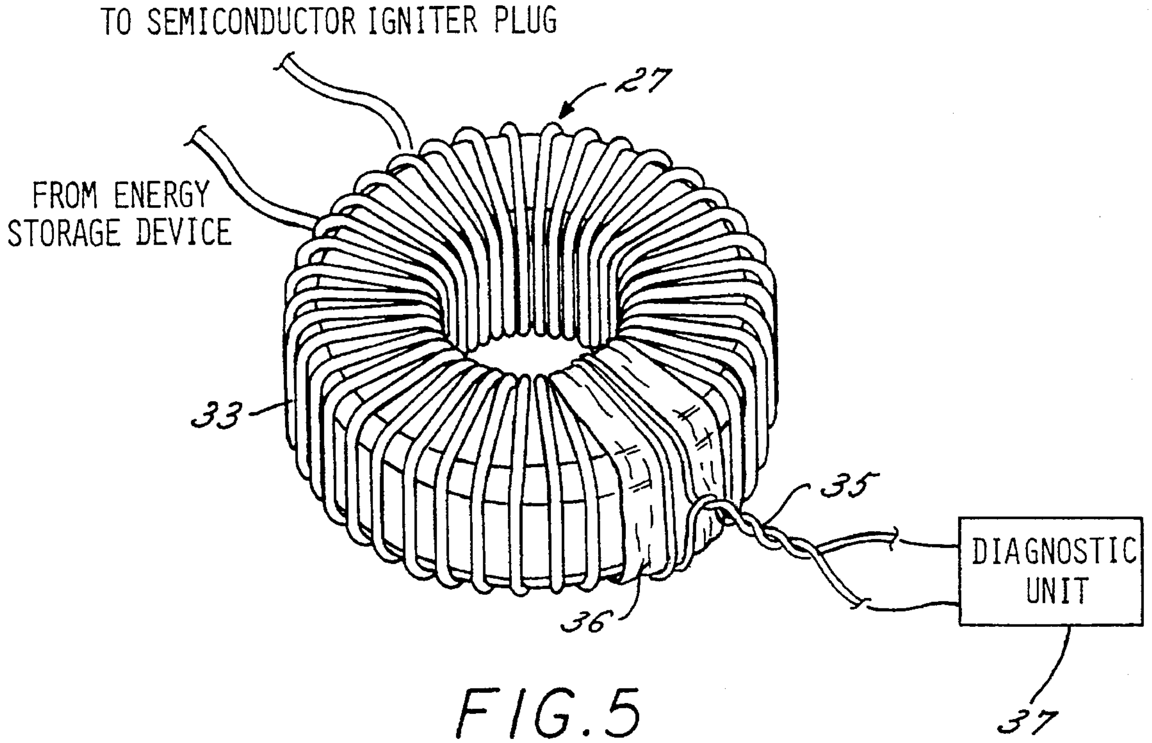
FIG. 5 is an isolated and perspective view of an output inductor of an ignition system according to the invention, illustrating a sensing device associated with the inductor for use in diagnostics.

In keeping with the invention, the toroid and its main winding 33 as shown in FIG. 5 must be sized so that three conditions are met. First, the saturated inductance of the inductor must be chosen to control the peak current during the discharge of energy at the gap of the plug. Secondly, the initial inductance of the inductor must be sufficiently great to limit the initial current to a relatively small value by limiting the value of di/dt. The third condition that must be satisfied by the inductor is related to the physical volume of the toroid which affects how much energy the saturable inductor may store. The delay between the initial appearance of high voltage at the ignition plug and the occurrence of a high di/dt at the plug results from the inductor's ability to absorb energy and later release it.

Because the saturable inductor is directly in the path of the spark current at the plug gap, the saturable core of the inductor may be used to provide monitoring of the spark characteristics and behavior over time. In accordance with another important aspect of the invention, by providing a secondary winding 35 of only one or two turns as shown in FIG. 5, a sensing device can be realized for monitoring the behavior of the spark current. Although the signal from the secondary winding 35 does not duplicate the waveform of the spark current, the secondary signal can be correlated to the current waveform in a manner which allows determination of the quality of the spark, conditions of the ignitor plug 21, performance of the exciter circuitry and of the general combustion/ignition process.

It is a well known laboratory problem that measuring currents in high voltage systems is potentially dangerous and requires careful isolation considerations so that the measuring signal can be maintained near ground potential. Typically, auxiliary voltage and/or current transformers are used for this purpose, but they are additional hardware parts which invariably cause insertion losses and are physically difficult to place in a circuit such as the exciter circuit for an ignition system. Furthermore, placement of an auxiliary transformer at an appropriate monitoring point can adversely affect the waveforms instead of only monitoring them. However, the addition of a secondary winding 35 on the same saturable-core toroid 27 as illustrated in FIG. 5, provides an isolated signal which is safe, low-voltage and reflects the behavior of the inductor and the system. Preferably, tape 36 wrapped about the toroid 27 as an insulation between the windings of the inductor 22 and the windings of the sensor 35.

In the ignition system of the invention, the main winding 33 of the inductor will generally have a large number of turns (e.g., 68). If the secondary winding 35 has one turn, the step-down ratio will be 1/68. Therefore, for an output voltage of 2,500 volts, the diagnostic output from the secondary will be limited to about 36 volts. From the secondary winding, the signal is delivered to a diagnostic unit 37 for analysis by a variety of conventional analog or digital methods. The results of any analysis provided by the diagnostic unit may be used to indicate performance of the spark current or to signal the need for maintenance or ignitor replacement.

Specifically, in a simplified form, the diagnostic system can distinguish the following conditions: 1) failed plug which appears as an open circuit; 2) performance indication which is based on spark duration; 3) electrical failure of the lead or severe fouling of the plug which appears as a short circuit; and 4) failure of the exciter which results in no output pulse.

Figure 7:
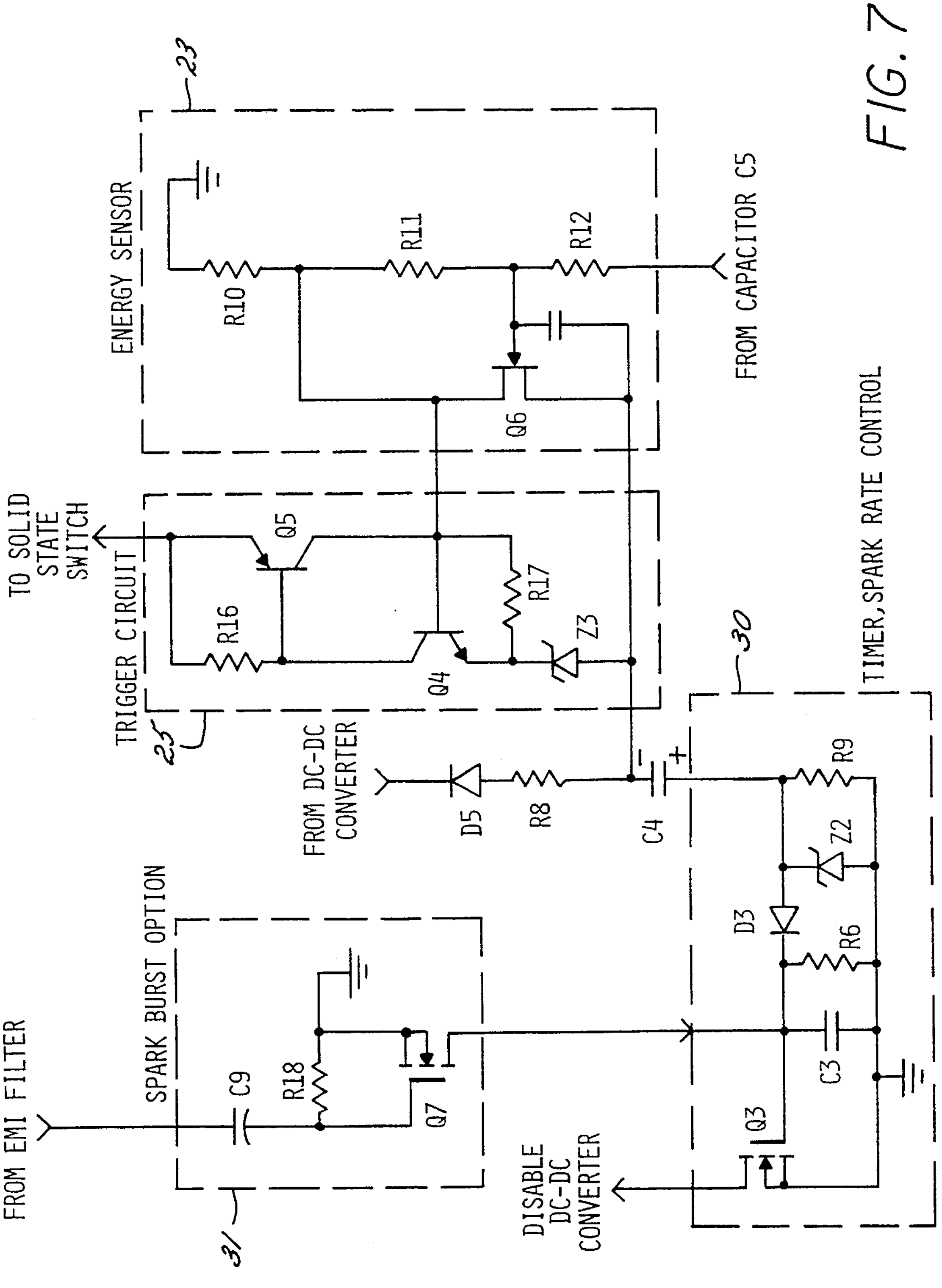
FIG. 7 is a circuit diagram according to an exemplary embodiment of the invention of a trigger circuit for initiating the transfer of energy from the energy storage device to the spark gap of the ignition system.
Figure 8:
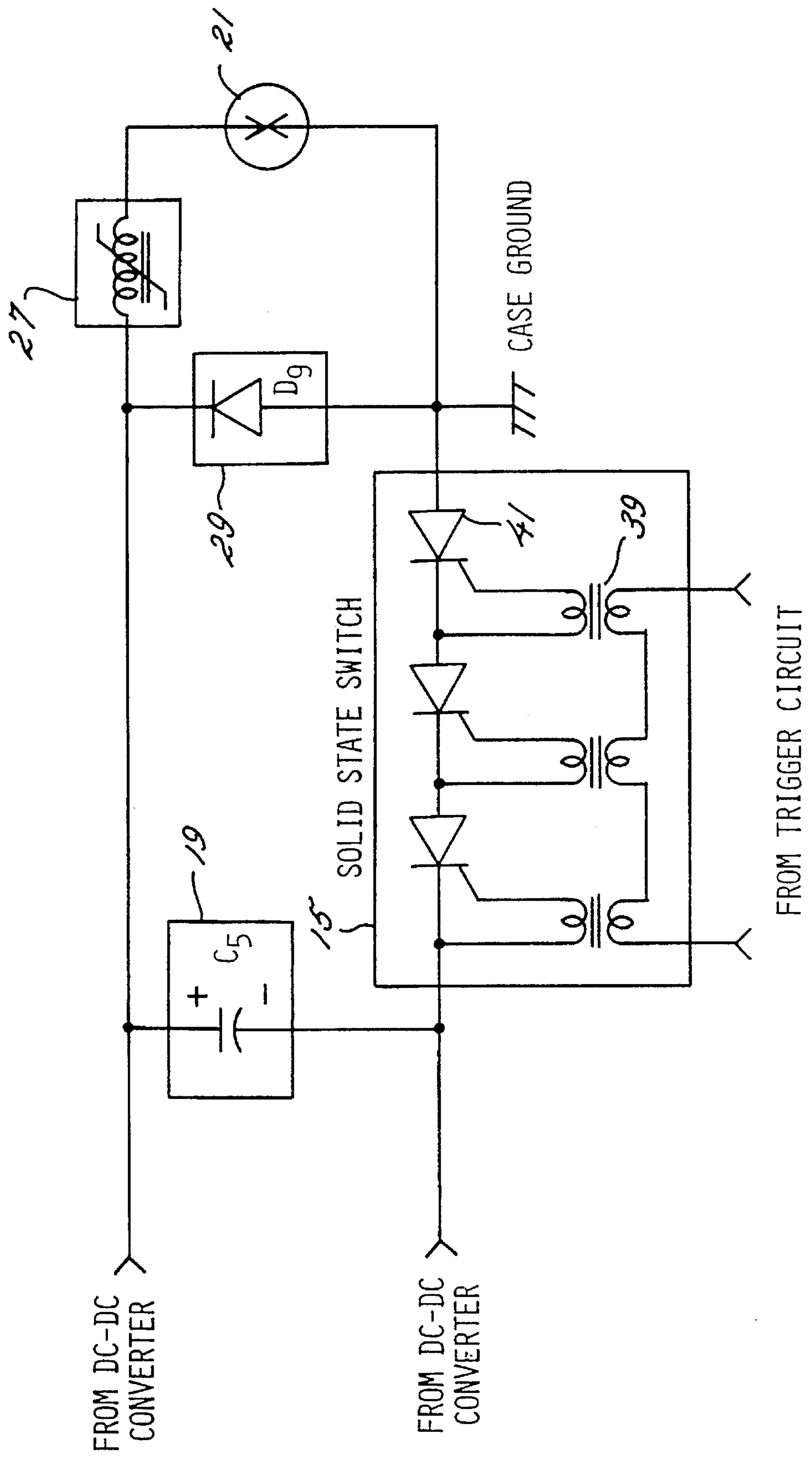
FIG. 8 is a circuit diagram according to an exemplary embodiment of an output circuit of a unipolar ignition system for use with the DC-to-DC converter and trigger circuits of FIGS. 6 and 7, respectively.

An illustration of a specific embodiment of the ignition system circuit according to the invention is shown in FIGS. 6, 7 and 8. Although this specific embodiment is presently applicant's design choice, it will be appreciated by those skilled in the art that other particular designs of unipolar ignition systems may be equally well suited for applicant's invention.

Turning now to a detailed description of the operation of the system illustrated in FIG. 6, when the ignition system is initially connected to the DC power source 17, filtered power is delivered to the DC-DC converter 11 by the EMI filter 20 which charges C1. A small current flows from capacitor C1 to resistor R2, zener diode Z1 and resistor R1 to ground. This puts a positive bias on the gate of transistor Q1, causing it to partially turn on and allow current to flow between the drain and source of Q1. This current is delivered to the primary N1 of the transformer T1 by way of the capacitor C1. From the transistor Q1, the current flows through the resistor R1 to ground. The transistor Q1 is preferably a power MOSFET, N-channel enhancement mode device.

The secondary winding N2 of the transformer T1 is a feedback winding which causes a positive voltage to be fed back to the base of the MOSFET Q1 via the resistor R5 and capacitor C2. The feedback of the positive voltage causes the MOSFET Q1 to be fully turned on by way of a hard forward bias. In order to protect the gate-to-source junction of the MOSFET Q1, a zener diode Z1 clamps the feedback voltage from the winding N2 at a level which does not exceed the rated value ($V_{gs}$) of the gate-to-source junction of the MOSFET Q1.

During the time that the MOSFET Q1 is turned on, the polarity of the outputs from the secondary windings N2 and N3 of the transformer T1 are positive. The positive potential from the outputs of N2 and N3 cooperate with the diode D4 to effectively de-couple the DC-to-DC converter 11 (including the primary and secondaries of the transformer T1) from the energy storage device 19 of the system which is the capacitor C5 in FIG. 6. It should be noted that the diode sees a positive voltage (e.g., approximately 1,000 volts) when a new charging cycle begins. In the illustrated ignition, the main storage capacitor C5 becomes charged to a high negative voltage (e.g., approximately –2,500 volts); therefore, at the end of the charging cycle the diode D4 must block full range of the potential energy (e.g., at least 1,000 plus 2,500 volts or 3,500 volts).

In order to institute the flyback cycle of the converter 11, the converter responds to a voltage across resistor R1 which is proportional to the current through the primary N1 of the transformer T1. When the current reaches three amperes, the voltage across the current sensing resistor R1 is approximately 0.75 volts which is enough to turn on the transistor Q2 via the voltage divider network of R3, and R4. By turning on the transistor Q2, the gate of MOSFET Q1 is forced low, thus turning off Q1 and opening the current path of the primary current and thereby limiting the current to three amperes. This technique is known in the art as current-mode control.

By interrupting the current through the primary N1 of the transformer T1, the magnetic field coupling the windings N1, N2 and N3 collapses, and the energy stored in the winding N1 is transferred to the secondary windings N2 and N3. The windings N2 and N3 are typically a single winding with a tap. When the primary current is interrupted and the energy stored in the winding N1 is transferred to the secondary windings N2 and N3, the polarity of the energy stored in the secondary windings is reversed, thereby causing the outputs of the secondary windings to assume a negative potential. The output voltage from the winding N3 is clamped by the diode D4 to a predetermined voltage relative to the negative plate of the main storage capacitor C5. Accordingly, the negative potential at the output of the secondary winding N3 creates an output current which charges the capacitor C5 in the negative direction.

The tap output between the secondary windings N2 and N3 provides a relatively low voltage to the capacitor C4 which is used as a source of energy by the logic circuit 13. The voltage $V_{N2}$ charges the capacitor C4 through a diode D5 and resistor R8 to a predetermined voltage (e.g., −80 volts) as discussed hereinafter in connection with the trigger circuit 25 shown in FIG. 7. Also, the voltage at the center tap between windings N2 and N3 is coupled back to the MOSFET Q1 in the DC-to-DC converter 11 via resistor R5 and capacitor C2. This negative voltage from the secondary windings N2 and N3, upon the initial turning off of the MOSFET Q1, serves to complete the turnoff of Q1 by providing a hard negative voltage to the gate of Q1, thereby ensuring that the MOSFET Q1 remains off until all of the energy in the secondary windings N2 and N3 is transferred to the main storage capacitor C5.

Turning now to FIG. 7, the energy sensor circuit 23 senses the voltage at the energy storage capacitor C5 by way of a voltage divider, R11 and R12. In the illustrated embodiment, when the voltage at the negative terminal of the capacitor C5 reaches a predetermined level (e.g., −2500 volts), the solid state switch 15 is closed so as to transfer the energy stored in the capacitor C5 to the spark gap. The solid state switch 15 is preferably a single SCR 41 or a series of SCRs which are fired by way of pulse transformers 39, as shown in FIG. 8.

As the capacitor C5 charges toward a predetermined level, a voltage divider network comprising R10, R11, and R12 in FIG. 7 biases the gate of an N-channel JFET Q6 such that it remains on. In its on state, the JFET Q6 holds the transistor Q4 in an off condition because the JFET Q6 provides an effective shunt circuit for the base of the transistor Q4. As the gate-to-source voltage of the JFET Q6 becomes negative during the charging of the storage capacitor C5, the JFET Q6 approaches a cutoff condition. Upon the turning off of JFET Q6, a switch in the trigger circuit 25 comprised of transistors Q4 and Q5 is closed, allowing the energy stored in capacitor C4 to be discharged into the pulse transformers 39 of the solid state switch in FIG. 8.

When the voltage on the storage capacitor C5 reaches a predetermined fully charged value, the gate-to-source voltage of the JFET Q6 is sufficiently negative to turn off the Q6, thereby allowing a current to flow in the base of the transistor Q4 via the resistor R10 and zener diode Z3. As the transistor Q4 turns on, the transistor Q5 is also being turned on. The changing biasing of the collector, emitter and base of the transistor Q4 complements the biasing of the transistor Q5 such that it turns on and accelerates the turning on of the transistor Q4. As a result, the combination of transistors Q4 and Q5 will latch in the on-state until C4 is fully discharged. Essentially, the transistors Q4 and Q5 and the resistors R16 and R17 function as an SCR-type device for delivering a trigger signal to the SCRs 41 comprising the solid state switch 15 via the aforementioned pulse transformers 39, as shown in FIG. 8.

In response to activating the trigger circuit 25, a discharge current is developed from the capacitor C4 which must also flow through the resistor R9 and the zener diode Z2 in the timer circuit 30. The discharge current in cooperation with the resistor R9 and zener diode Z2 causes a pulse to appear in the timer circuit 30. The timer is an RC network composed of resistor R6 and capacitor C3. The capacitor C3 is charged by the pulse via a diode D3. However, the diode allows the capacitor C3 to discharge only through resistor R6. The charged capacitor C3 turns on a MOSFET Q3. As the voltage on the capacitor C3 is discharged through the resistor R6, the MOSFET Q3 turns off. While the MOSFET Q3 is on, however, the timer circuit 30 sends a disable signal to the DC-DC converter 11 of FIG. 6.

Also shown in FIG. 7 is an optinal spark burst circuit 31 which connects to the timer 30 at the gate of Q3. As was discussed in connection with FIG. 1, the spark burst circuit 31 alters the spark rate either abruptly or gradually so that a temporary high spark rate exists when starting the engine, followed by a lowering of the rate thereafter. In FIG. 7, the arrival of DC input power via the EMI filter is used to indicate that an ignition sequence is beginning. The voltage is applied to an RC timing network comprised of R18 and C9. When voltage is applied, the junction of R18 and C9 rises instantly with the applied voltage, and then decays slowly toward ground as R8 charges C9. The initial rise of voltage at the junction is coupled to the gate of a MOSFET Q7 which turns on immediately with its gate pulled high. As the junction voltage decays toward zero, the gate-source voltage decreases until $V_{gs}$OFF is reached (i.e., 1–2 volts) and then the Q7 switches off.

During the time Q7 is on (i.e., approximately 5–30 seconds), the timer 30 is disabled, because the gate of Q3 is pulled low by Q7. With Q3 forced off, the DC-DC converter is not disabled, and will run continuously. This will charge and fire the exciter at a high rate. Once Q7 turns off, the high impedance of its drain-source circuit decouples it from the timer circuit.

It should be obvious to those skilled in the art that other configurations for the spark burst time delay are possible, and also that the input which triggers the spark burst could be from an external signal, for example from the ECU. It should also be noted that an alternative digital method is anticipated which allows a preset number of sparks to occur at a fixed high rate, and then switches to a low rate. Such an implementation could take the form of a preset digital counter, or could be implemented by an appropriate instruction sequence for a microcontroller which performs the complete logic functions of an ignition system.

As illustrated in FIG. 8, the solid state switch 15 of the ignition system is preferably realized by way of a series of connected SCRs 41, each having a high standoff voltage and very high pulse current capacity. Applicant notes it would be preferable to use one SCR, but it is unlikely to find an SCR rated for the required voltage (e.g., 2,500 volts). Upon the firing of the series connected SCRs, the energy stored in the storage capacitor C5 is discharged to the semiconductor ignitor plug 21 via the saturable inductor 27. When the SCRs are fired by the trigger circuit 25, the negative plate of the capacitor C5 is effectively pulled to an electrical ground, thereby causing the positive plate of the capacitor C5 to swing from a ground potential to a high positive voltage (e.g., +2,500 volts DC).

The positive voltage on the capacitor C5 reverses the bias on the diode D9, thereby effectively de-coupling the positive plate of the capacitor from the ground potential, typically defined by the potential of the housing for the ignition system. The high potential at the positive plate of the capacitor C5 is presented to the ignitor plug 21 by way of the saturable inductor 27.

The energy for generation of a spark ($CV^2$) is first stored as an electrical potential in the capacitor C5 and second is transferred to the saturable inductor 27 where it is stored as magnetic energy ($LI^2$). When the capacitor C5 is fully discharged, the diode D9 becomes forward biased and maintains the current across the gap of the plug 21 and through the diode D9 and the saturable inductor 27. With the full discharge of the capacitor C5, the solid state switch 15 is no longer part of the current path.

Although the presence of a saturable core inductor in the ignition system of the invention relieves the SCRs of some severe operational requirements otherwise necessary, overall system efficiency and dependability nevertheless depend in part on a conservative choice for the SCRs. It will be appreciated by those familiar with SCRs that in the circuit of FIG. 8 they must be able to withstand the maximum voltage to which the capacitor C5 is charged. When multiple SCRs are used in a series string as in the illustrated embodiment, their effective standoff voltage is multiplied by the number of devices in the string. Although applicant anticipates the use of other devices for solid state switch 15, SCRs are at this time preferred because of their ability to handle high current surges in their on-state and withstand high potentials in their off-state. In general, the preferred solid state switch 15 should have a good physical construction capable of withstanding repeated thermal cycling. The SCRs 41 must have adequate chip area to give them a low forward voltage drop since the surge currents are very high and efficiency is compromised by losses in the switch 15. These parameters for the solid state switch 15 must be maintained over the entire temperature and pressure ranges of the intended application. Additionally, the turn-on time of the switch 15 must be fast relative to the delay available from the saturable core inductor 27. However, the di/dt rating of the SCR is not as important since the rate of current rise is controlled by the saturable inductor during the turn-on period when the switch 15 is most susceptible to damage.

Figure 9:
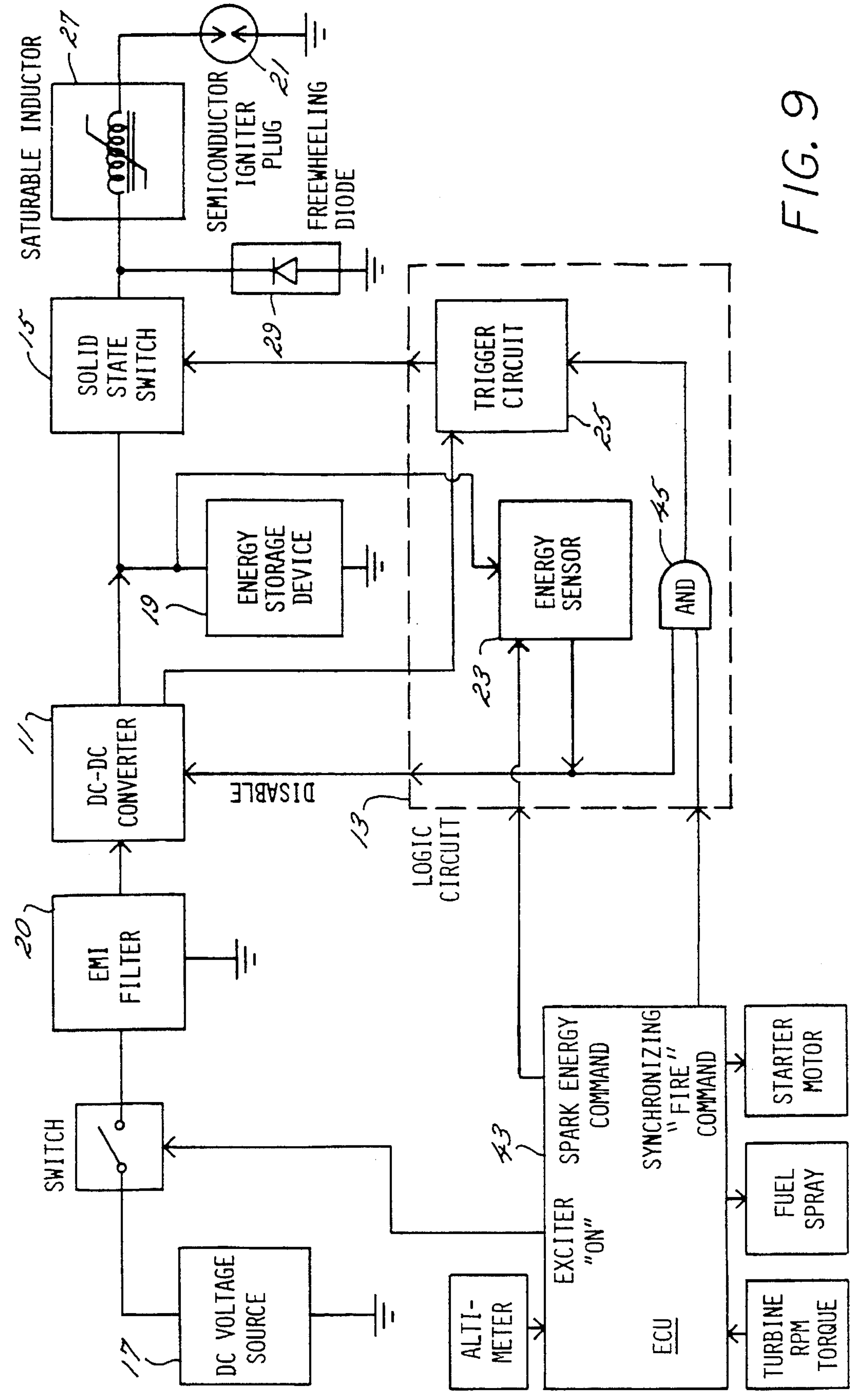
FIG. 9 is a block diagram of the ignition system of the invention according to a second embodiment, incorporating provisions for responding to the controls of a turbine engine in order to synchronize spark timing to the starting cycle of the turbine.

Turning to an alternative embodiment of the invention illustrated in FIG. 9, in certain high performance turbines, the ignition window (the time interval when a spark most probably causes ignition) may be very short, and fixed rate sparks can easily occur just before and after the ideal time. In the system of FIG. 1 as well as most conventional ignition systems, the spark discharge occurs automatically when the voltage at the energy storage device 19 reaches a level at which the desired amount of spark energy, $CV^2$, has been stored. In conventional arc-gap tube exciters, this level is fixed by the breakdown voltage of the arc-gap, which cannot maintain its off-state in the presence of a fully charged energy storage capacitor. Timing the application of DC power to the exciter circuitry of the ignition system is not an acceptable solution for placing the spark within the ignition window since the charging time of the exciter circuitry depends upon the value of DC input voltage (i.e., 10–30 volts) and thus the interval from the application of DC power until the initiation of a spark will vary considerably.

As illustrated in FIG. 9, the logic circuit 13 of FIG. 1 may be modified to provide a configuration wherein the energy sensor 23 disables the DC-to-DC converter 11, but does not cause the trigger circuit 25 to immediately fire the solid state switch 15. Instead, the firing of the solid state switch 15 is delayed until a command from an external input. After the energy storage device 19 has reached its full energy, the DC-to-DC converter is disabled as explained in connection with FIG. 1. However, in accordance with this alternative embodiment, the trigger circuit 25 must also wait for a synchronization command from the Engine Control Unit (ECU) 43. The ECU generally performs a sequence of functions to start the engine. The sequence usually includes the following: 1) apply DC voltage to the exciter circuitry; 2) engage the starter motor to accelerate the turbine to a percentage of full speed; 3) start fuel spray; 4) fire the ignitor system at a precise moment of best ignition condition; and 5) continue to fire the ignition system or allow it to continue at its own rate. The ECU is a commercially available unit which controls the operation of the turbine engine; it most generally controls the fuel flow in response to altitude, torque, RPM and commands from the pilot. It is reasonably sophisticated and capable of providing commands to the ignition system to optimize performance. Another useful signal that the ECU is capable of generating is a "spark energy" command signal which can directly control the energy sensor 23 to halt the charging of the energy storage device 19 at any particular level. An example of such a signal is one based on altitude which anticipates a more difficult ignition at high altitudes and would therefore request more energy. From a comparison of FIGS. 1 and 9, it will be appreciated that like-numbered devices in the two illustrations indicate they are common to both embodiments of the invention. These common devices need not be discussed in detail again in connection with the embodiment of FIG. 9.

Referring to the alternative embodiment for the logic circuit 13 in FIG. 9, the signal to the trigger circuit 25 which initiates the spark is made dependent upon two conditions. First, the energy sensor 23 must indicate that the energy storage device 19 is charged to the level commanded by the ECU 43. Second, the synchronizing "fire" command from the ECU must occur, and the ECU delays this command until it has established the correct fuel flow for the altitude (mixture) and the engine has reached the proper starting speed. At this time, conditions are optimum for the first spark to ignite the mixture. The AND gate 45 in FIG. 9 defines the two-condition requirement for the first spark; it also allows the ECU 41 to control the successive sparks by several optional methods. If the ECU needs to generate just one spark, it returns the "fire" command line to an off condition—thus it merely pulses the line. If the ECU decides additional sparks controlled by its own timing, then it successively pulses the "fire" command each time a spark is desired—provided that it has allowed the exciter enough time to recharge the energy storage device. If the ECU decides to allow the exciter to generate sparks at its predefined rate, then it leaves the "fire" command line in the on condition. As is true for any AND function, if one input of the AND gate 45 is maintained in the on condition, then the other input is transmitted through to the output unaltered.

Thus, without an ECU interface, or if the ECU has delegated control to the exciter, the trigger circuit 25 will be responsive to the energy sensor 23 as discussed in reference to FIG. 1, and will trigger a spark each time the energy sensor 23 detects that the energy storage device is recharged.

From the foregoing, it will be appreciated that an ignition system is disclosed which provides improved performance relative to conventional ignition systems, particularly unipolar ignitions for turbine engines. The invention utilizes solid state switching and controls to provide a highly versatile ignition system having a characteristic high energy spark current which ensures reliable ignition without stressing the solid state components. In this connection, the characteristic spark current is thought to also reduce the stress of a semiconductor-type ignitor plug, thereby effectively extending the life of the plug. By utilizing solid state switching and controls, the invention provides for the precise timing of an ignition sequence by responding to an external signal, such as a timing signal from a control unit of the engine. The solid state devices also provide for an ignition sequence that begins with a burst of sparks for the purpose of igniting the engine fuel, followed by continued repeating of sparks at an average rate much less than the average rate of the burst. Finally, the saturable output inductor of the ignition system is advantageously utilized to provide a diagnostics signal indicative of the quality of the spark at the plug.

We claim:

1. An ignition system for a gas turbine engine comprising:

an energy storage device to store energy;

a controlled switch connected in series with the energy storage device and transitioning from a non-conducting state to a conducting state for selectively discharging the energy from the energy storage device upon receipt of a control signal, the controlled switch having an associated turn-on time period T1 for transitioning from the non-conducting state to the fully conducting state, the turn-on time period T1 commencing when the controlled switch receives the control signal and terminating when the controlled switch enters the fully conducting state;

a spark generating device connected in series with the controlled switch and the energy storage device, the spark generating device having an associated turn-on time period T2 for transitioning from a non-conducting state to a conducting state, the turn-on time period T2 commencing when the spark generating device begins to receive the energy discharged by the energy storage device and terminating when the spark generating device enters the conducting state; and, a delay network connected in series in any order with the controlled switch and the spark generating device for limiting current flow through the spark generating device for a time period T3 after which the current through the spark generating device is not limited by the delay network, the time period T3 commencing when the delay network begins to receive the energy discharged by the energy storage device and ending after the turn-on time period T2 of the spark generating device has terminated, wherein the current through the spark generating device rises to an increased level after the period T3 has terminated.

2. An ignition system for a gas turbine engine comprising:

an energy storage device to store energy;

a bi-state switch connected in series with the energy storage device, the bi-state switch having a fully conducting state and a non-conducting state, the bi-state switch requiring a transition time period T1 to transition from the non-conducting state to the fully conducting state;

a sparking device connected in series with the bi-state switch and the energy storage device, the sparking device having a non-conducting state and a conducting state and requiring a transition time period T2 to transition from the non-conducting state to the conducting state; and, a current limiting network connected in series in any order with the bi-state switch and the sparking device to limit current flow through the sparking device until the sparking device has completed its transition time period T2 and to thereafter permit an increased current to flow through the sparking device to generate sparks.

3. An exciter for energizing a spark generating device to ignite fuel in a gas turbine engine, the spark generating device having an associated turn-on time period T1 for transitioning from a non-conducting state to a conducting state, the turn-on time period T1 commencing when the spark generating device begins to receive energy from the exciter and terminating when the spark generating device enters the conducting state, the exciter comprising:

an energy storage device to store energy;

a controlled switch connected in series with the energy storage device and transitioning from a non-conducting state to a conducting state for selectively discharging the energy from the energy storage device upon receipt of a control signal, the controlled switch having an associated turn-on time period T2 for transitioning from the non-conducting state to the fully conducting state, the turn-on time period T2 commencing when the controlled switch receives the control signal and terminating when the controlled switch enters the fully conducting state;

an output terminal for removably connecting the spark generating device, the output terminal being connected in series with the energy storage device and the controlled switch to receive the energy discharged from the energy storage device and to output the received energy to the spark generating device; and, a delay network connected in series with the controlled switch and the output terminal for limiting current flow through the spark generating device for a time period T3 after which the current through the spark generating device is not limited by the delay network, the time period T3 commencing at substantially the same time as the turn-on time period T1 of the spark generating device and ending after the turn-on time period T1 of the spark generating device has terminated, wherein the current through the spark generating device rises to an increased level after the period T3 has terminated.

4. An exciter for energizing a spark generating device to ignite fuel in a gas turbine engine, the spark generating device having an associated turn-on time period T1 for transitioning from a non-conducting state to a conducting state, the turn-on time period T1 commencing when the spark generating device begins to receive energy from the exciter and terminating when the spark generating device enters the conducting state, the exciter comprising:

an energy storage device to store energy;

a bi-state switch connected in series with the energy storage device, the bi-state switch having a fully conducting state and a non-conducting state, the bi-state switch requiring a transition time period T2 to transition from the non-conducting state to the fully conducting state;

an output terminal for removably connecting the spark generating device to the exciter, the output terminal being connected in series with the energy storage device and the bi-state switch to receive the energy discharged from the energy storage device and to output the received energy to the spark generating device; and, a current limiting network connected in series in any order with the bi-state switch and the sparking device to limit current flow through the sparking device until the sparking device has completed its transition time period T1 and to thereafter permit an increased current to flow through the sparking device to generate sparks.

5. An exciter for energizing a spark generating device to ignite fuel in a gas turbine engine, the spark generating device having an associated turn-on time period T1 for transitioning from a non-conducting state to a conducting state, the turn-on time period T1 commencing when the spark generating device begins to receive energy from the exciter and terminating when the spark generating device enters the conducting state, the exciter comprising:

an energy storage device to store energy;

a controlled switch connected in series with the energy storage device and transitioning from a non-conducting state to a conducting state for selectively discharging the energy from the energy storage device upon receipt of a control signal;

an output terminal for removably connecting the spark generating device, the output terminal being connected in series with the energy storage device and the controlled switch to receive the energy discharged from the energy storage device and to output the received energy to the spark generating device; and, a delay network connected in series with the controlled switch and the output terminal for limiting current flow through the spark generating device for a time period T2 after which the current through the spark generating device is not limited by the delay network, the time period T2 commencing at substantially the same time as the turn-on time period T1 of the spark generating device and ending after the turn-on-time period T1 of the spark generating device has terminated, wherein the current through the spark generating device rises to an increased level after the period T2 has terminated.

6. An exciter as defined in claim 4 wherein the time period T3 ends after the turn-on time period T2 of the bi-state switch has terminated.

7. An exciter as defined in claim 3 wherein the time period T3 ends after the turn-on time period T2 of the controlled switch has terminated.

8. An ignition system as defined in claim 1 wherein the time period T3 ends after the turn-on time period T1 of the controlled switch has terminated.

9. An ignition system as defined in claim 1 wherein the energy storage device comprises at least one capacitor.

10. An ignition system as defined in claim 1 wherein the controlled switch comprises at least one SCR.

11. An ignition system as defined in claim 1 wherein the spark generating device comprises an igniter plug.

12. An ignition system as defined in claim 1 wherein the delay network comprises at least one saturable core inductor.

13. An ignition system as defined in claim 1 wherein the delay network comprises one winding of a magnetic device, the winding being connected in series in any order with the controlled switch and the spark generating device.

14. An ignition system as defined in claim 2 wherein the energy storage device comprises at least one capacitor.

15. An ignition system as defined in claim 2 wherein the bi-state switch comprises at least one SCR.

16. An ignition system as defined in claim 2 wherein the sparking device comprises an igniter plug.

17. An ignition system as defined in claim 2 wherein the current limiting network comprises at least one saturable core inductor.

18. An ignition system as defined in claim 2 wherein the current limiting network comprises one winding of a magnetic device, the winding being connected in series in any order with the bi-state switch and the sparking device.

* * * * *